US010429646B2

(12) United States Patent
Kress et al.

(10) Patent No.: US 10,429,646 B2
(45) Date of Patent: Oct. 1, 2019

(54) FREE SPACE OPTICAL COMBINER WITH PRESCRIPTION INTEGRATION

(71) Applicant: Google Inc., Mountain View, CA (US)

(72) Inventors: Bernard C. Kress, Redwood City, CA (US); Adam E. Norton, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 165 days.

(21) Appl. No.: 14/925,563

(22) Filed: Oct. 28, 2015

(65) Prior Publication Data

US 2017/0123207 A1    May 4, 2017

(51) Int. Cl.
*G02C 3/00* (2006.01)
*G02B 27/01* (2006.01)
(Continued)

(52) U.S. Cl.
CPC ....... *G02B 27/0172* (2013.01); *G02B 27/017* (2013.01); *G02B 27/143* (2013.01);
(Continued)

(58) Field of Classification Search
CPC .............. G02B 27/0172; G02B 27/143; G02B 27/4205; G02B 27/0103; G02B 5/09;
(Continued)

(56) References Cited

U.S. PATENT DOCUMENTS 3,936,605 A    2/1976    Upton
4,799,765 A    4/1989    Ferrer
(Continued)

FOREIGN PATENT DOCUMENTS

EP    0 898 726 B1    3/2000
EP    0 995 145 B1    9/2001
(Continued)

OTHER PUBLICATIONS

Kress, Bernard et al., "Low Cost Replicable Plastic HUD combiner element", Photonics in the Transportation Industry: Auto to Aerospace II, Proc. SPIE vol. 7314, 73140I, Apr. 13, 2009, 8 pages, Orlando, Florida.
(Continued)

*Primary Examiner* — Mustak Choudhury

(57) ABSTRACT

A prescriptive see-through eyepiece includes a meniscus lens body and an optical combiner. The meniscus lens body has an external scene side with a convex curvature and an eye-ward side with a concave curvature. The optical combiner is disposed within the meniscus lens body to combine image light incident through the eye-ward side with external scene light incident through the external scene side into a combined image. The optical combiner is partially reflective and imparts substantially no lensing power to the external scene light passing through. The optical combiner along with the concave curvature of the eye-ward side are configured to impart prescriptive lensing to the image light while the convex curvature of the external scene side and the concave curvature of the eye-ward side are configured to impart the prescriptive lensing to the external scene light.

6 Claims, 9 Drawing Sheets

(51) Int. Cl.
*G02B 27/14* (2006.01)
*G02B 27/42* (2006.01)
*G02C 7/02* (2006.01)

(52) U.S. Cl.
CPC ........... *G02B 27/4205* (2013.01); *G02C 7/02* (2013.01); *G02B 2027/013* (2013.01); *G02B 2027/0174* (2013.01); *G02B 2027/0178* (2013.01); *G02C 2202/20* (2013.01)

(58) Field of Classification Search
CPC ............ G02B 5/1861; G02B 27/1086; G02B 27/144; G02B 27/1066; G02B 27/0093; G02B 27/01; G02B 27/017; G02B 27/0075; G02B 27/0101; G02B 2027/0107; G02B 2027/0127; G02B 2027/0129; G02B 2027/0138; G02B 2027/0145; G02B 2027/0154; G02B 2027/0174; G02B 2027/0187; G02B 2027/0198; G02B 2027/0114; G02B 2027/0123; G02B 2027/0132; G02B 2027/0178; G02B 2027/011; G02B 2027/012; G02B 2027/014; G02B 27/0081; G02B 27/02; G02B 27/14; G02B 17/006; G02B 3/08; G02B 3/3413; G02C 7/02; G02C 7/022; G02C 7/086; G02C 7/12; G02C 7/14; G02C 7/101; G03B 21/005; A63B 33/002
USPC ... 359/13–15, 410, 576, 629, 630–632, 732, 359/743; 351/159.7, 159.58; 345/8, 87, 345/32, 102; 349/11; 353/11
See application file for complete search history.

(56) References Cited

U.S. PATENT DOCUMENTS

| | | | |
|---|---|---|---|
| 5,050,966 A | 9/1991 | Berman | |
| 5,191,472 A | 3/1993 | Kurematsu et al. | |
| 5,237,455 A | 8/1993 | Bordo et al. | |
| 5,537,253 A | 7/1996 | Cox et al. | |
| 5,654,827 A * | 8/1997 | Reichert | G02B 27/0101 359/631 |
| 5,694,230 A | 12/1997 | Welch | |
| 5,821,911 A | 10/1998 | Jachimowicz | |
| 5,870,224 A | 2/1999 | Saitoh et al. | |
| 5,880,888 A | 3/1999 | Schoenmakers et al. | |
| 5,886,822 A | 3/1999 | Spitzer | |
| 5,943,171 A | 8/1999 | Budd et al. | |
| 5,949,583 A | 9/1999 | Rallison et al. | |
| 5,995,071 A | 11/1999 | Mertz | |
| 6,005,714 A | 12/1999 | Welch | |
| 6,023,372 A | 2/2000 | Spitzer et al. | |
| 6,031,662 A | 2/2000 | Miller et al. | |
| 6,097,543 A | 8/2000 | Rallison et al. | |
| 6,147,807 A | 11/2000 | Drossler et al. | |
| 6,204,975 B1 | 3/2001 | Watters et al. | |
| 6,236,509 B1 | 5/2001 | Grandjean et al. | |
| 6,236,511 B1 | 5/2001 | Brown | |
| 6,256,149 B1 | 7/2001 | Rolfe | |
| 6,330,118 B1 | 12/2001 | Daschner et al. | |
| 6,349,004 B1 | 2/2002 | Fischer et al. | |
| 6,353,503 B1 * | 3/2002 | Spitzer | G02B 27/017 359/630 |
| 6,356,392 B1 | 3/2002 | Spitzer | |
| 6,462,882 B2 | 10/2002 | Chen et al. | |
| 6,466,471 B1 | 10/2002 | Bhattacharyya | |
| 6,690,516 B2 | 2/2004 | Aritake et al. | |
| 6,724,354 B1 | 4/2004 | Spitzer et al. | |
| 6,829,095 B2 | 12/2004 | Amitai | |
| 6,847,488 B2 | 1/2005 | Travis | |
| 7,095,562 B1 | 8/2006 | Peng et al. | |
| 7,119,965 B1 | 10/2006 | Rolland et al. | |
| 7,145,726 B2 | 12/2006 | Giest | |
| 7,205,960 B2 | 4/2007 | David | |
| 7,230,766 B2 | 6/2007 | Rogers | |
| 7,450,310 B2 | 11/2008 | McGuire | |
| 7,542,209 B2 | 6/2009 | McGuire, Jr. et al. | |
| 7,566,863 B2 | 7/2009 | Chang et al. | |
| 7,595,480 B2 | 9/2009 | Kress | |
| 7,595,933 B2 | 9/2009 | Tang | |
| 7,637,617 B2 | 12/2009 | Liu et al. | |
| 7,656,585 B1 | 2/2010 | Powell et al. | |
| 7,715,103 B2 | 5/2010 | Sprague et al. | |
| 7,724,442 B2 | 5/2010 | Amitai | |
| 7,821,715 B2 | 10/2010 | Suzuki et al. | |
| 7,895,780 B2 | 3/2011 | Lee | |
| 8,382,282 B2 | 2/2013 | Lytle | |
| 8,384,999 B1 * | 2/2013 | Crosby | G02B 27/0172 349/11 |
| 8,917,459 B2 | 12/2014 | Klein et al. | |
| 9,057,826 B2 | 6/2015 | Gupta et al. | |
| 2002/0034016 A1 | 3/2002 | Inoguchi et al. | |
| 2002/0186179 A1 | 12/2002 | Knowles | |
| 2003/0058543 A1 | 3/2003 | Sheedy et al. | |
| 2006/0215244 A1 | 9/2006 | Yosha et al. | |
| 2007/0070859 A1 | 3/2007 | Hirayama | |
| 2007/0252954 A1 | 11/2007 | McGuire, Jr. et al. | |
| 2008/0186547 A1 | 8/2008 | Shimizu et al. | |
| 2009/0067057 A1 | 3/2009 | Sprague et al. | |
| 2009/0180194 A1 | 7/2009 | Yamaguchi et al. | |
| 2009/0201589 A1 | 8/2009 | Freeman | |
| 2010/0046075 A1 * | 2/2010 | Powell | G02B 5/09 359/576 |
| 2010/0073579 A1 | 3/2010 | Okada et al. | |
| 2010/0079356 A1 | 4/2010 | Hoellwarth | |
| 2010/0149073 A1 * | 6/2010 | Chaum | G02B 27/0093 345/8 |
| 2011/0213664 A1 | 9/2011 | Osterhout et al. | |
| 2011/0221656 A1 | 9/2011 | Haddick et al. | |
| 2011/0261451 A1 | 10/2011 | Kwrk | |
| 2011/0261466 A1 | 10/2011 | Buch et al. | |
| 2012/0212399 A1 | 8/2012 | Border et al. | |
| 2012/0293548 A1 | 11/2012 | Perez et al. | |
| 2013/0107366 A1 | 5/2013 | Clarke | |
| 2013/0229712 A1 | 9/2013 | Kress | |

FOREIGN PATENT DOCUMENTS

| | | |
|---|---|---|
| JP | 2002-090687 | 3/2002 |
| JP | 2002 287077 A | 10/2002 |
| KR | 10-2007-0105657 | 10/2007 |
| KR | 10-2011-0117581 | 10/2011 |
| TW | 201516466 A | 5/2015 |
| WO | WO 00/79327 A1 | 12/2000 |
| WO | WO 2007/065995 | 6/2007 |
| WO | WO 2009/153446 A2 | 12/2009 |
| WO | WO 2010/097439 A1 | 9/2010 |
| WO | WO 2012/003529 A1 | 1/2012 |
| WO | WO 2012/056817 A1 | 5/2012 |

OTHER PUBLICATIONS

Kress, Bernard et al., "Digital combiner achieves low cost and high reliability for head-up display applications", SPIE Newsroom. DOI: 10.1117/2.1200904.1599, May 18, 2009, 3 pages.

Kress, Bernard et al., "Applied Digital Optics: From Micro-optics to Nanophotonics, Chapter 5: Digital Diffractive Optics: Analytic Type", 40 pages, 2009, John Wiley & Sons, Ltd.

Kress, Bernard et al., "Applied Digital Optics: From Micro-optics to Nanophotonics, Chapter 12: Digital Optics Fabrication Techniques", 74 pages, 2009, John Wiley & Sons, Ltd.

Kress, Bernard et al., "Applied Digital Optics: From Micro-optics to Nanophotonics, Chapter 14: Replication Techniques for Digital Optics", 27 pages, 2009, John Wiley & Sons, Ltd.

Kress, Bernard et al., "Applied Digital Optics: From Micro-optics to Nanophotonics, Chapter 16: Digital Optics Application Pools", 60 pages, 2009, John Wiley & Sons, Ltd.

PCT/US2013/023251; PCT International Search Report and Written Opinion of the International Searching Authority, dated May 15, 2013, 9 pages.

(56) References Cited

OTHER PUBLICATIONS

PCT/US2013/023251; PCT International Preliminary Report on Patentability, dated Sep. 12, 2014, 8 pages.
PCT/US2014/010192; PCT International Search Report and Written Opinion of the International Searching Authority, dated Jun. 11, 2014, 11 pages.
Kress, Bernard, "Sandwiched Diffractive Optical Combiner," U.S. Appl. No. 13/411,346, filed Mar. 2, 2012, 30 pages.
Saeedi, Ehsan et al., "Adjustable Lens Array With Variable Optical Power," U.S. Appl. No. 13/742,201, filed Jan. 15, 2013, 28 pages.
Adlens, "Emergensee," Adlens Variable Focus Eyewear, www.adlens.com, 3 page brochure downloaded from Internet, Nov. 2012.
Adlens, "Hemisphere Instant Prescription Eyeware," Adlens Variable Focus Eyewear, www.adlens.com, 4 page brochure downloaded from Internet, Nov. 2012.
Adlens, "John Lennon Collection," Adlens Variable Focus Eyewear, www.adlens.com, 4 page brochure downloaded from Internet, Nov. 2012.
PCT/US2016/056609—International Search Report and Written Opinion, dated Dec. 20, 2016, 12 pages.
Allowance of Patent Application dated Apr. 23, 2018 for TW Patent Application No. 105134857, 9 pages.
International Report on Patentability dated May 11, 2018 for PCT Application No. PCT/US2016/056609, 7 pages.
Office Action (with Translation) dated Jan. 11, 2018 for Taiwan Application No. 105134857, 14 pages.
Allsopp, Ashleigh, "Toshiba Glass Hands-on Review: Toshiba's First Smartglasses Aim to Take on Google Glass", PC Advisor, Jan. 8, 2015, accessed on Aug. 6, 2015 at <<http://www.pcadvisor.eo.uk/review/wearable-tech/toshiba-glass-hands-on-review-3593254/>>; 5 pages.
Intel, "New Wearables Face the Same Old Challenges", Intel Free Press, Jul. 2, 2015; accessed on Aug. 6, 2015 at <<http://www.intelfreepress.com/reNs/wearables-computer-history-museum/9720/>>, 3 pages.
Liang, Roger, "Glass, What Glass? Intel Snaps Up Swiss Eyeware Startup", ZDNet, Jan. 21, 2015; accessed on Aug. 6, 2015 at <<http://wwwzdnet.com/article/glass-what-glass-intel-snaps-up-swiss-eyeNear-startup/ >>, 5 pages.
Starner, Thad, "The Challenges of Wearable Computing: Part 1", IEEE Mircro, vol. 21, Issue 4, Jul.-Aug. 2001; pp. 44-52.

\* cited by examiner

FREE SPACE OPTICAL COMBINER WITH PRESCRIPTION INTEGRATION

TECHNICAL FIELD

This disclosure relates generally to the field of optics, and in particular but not exclusively, relates to near-to-eye displays.

BACKGROUND INFORMATION

In the field of optics, a combiner is an optical apparatus that combines two images together, from either the same side of the combiner (reflective/reflective, or transmissive/transmissive) or from the two different sides of the combiner (reflective/transmissive). Often times, optical combiners are used in heads up displays ("HUDs"), sometimes referred to as head mounted displays ("HMDs") or near-to-eye displays, which allow a user to view a computer generated image ("CGI") superimposed over an external view. The HMD enables the user to view the CGI without having to look away from his usual viewpoint. The term HMD originated from its use in avionics, which enabled a pilot to view information while looking forward with his head up, as opposed to looking down at an instrument panel. Conventional HMDs include tilted dichroic plates, holographic combiners, angled transparent substrates, and compound conjugate lenses.

Two versions of combiners exist. The first version combines two fields without adding any lensing to either field (typically a tilted dichroic plate or compound conjugate lenses). The second version includes a lensing functionality, in addition to the combining functionality, which is usually an off-axis aspheric lensing for the field coming from the display. The lensing functionality is used to displace the virtual image originating from the display into the far field or at a specific distance from the combiner and to give the image a certain field of view to enable the user to bring the virtual image into focus at the target size.

Since near-to-eye displays by definition are worn close to the user's eyes, HMDs can physically interfere with conventional prescription corrective glasses. In some configurations, a HMD may be worn over prescription corrective glasses, but such configurations are often awkward and uncomfortable. Conventional near-to-eye displays are not well suited for use with users that require prescription corrective lenses, unless the user chooses to wear contact lenses. However, many people who need prescription corrective lenses choose not to wear contact lenses for a variety of reasons and are thus left with less than desirable options when wearing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system, apparatus, and method of fabrication for a see-through near-to-eye display that incorporates a corrective eye prescription are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
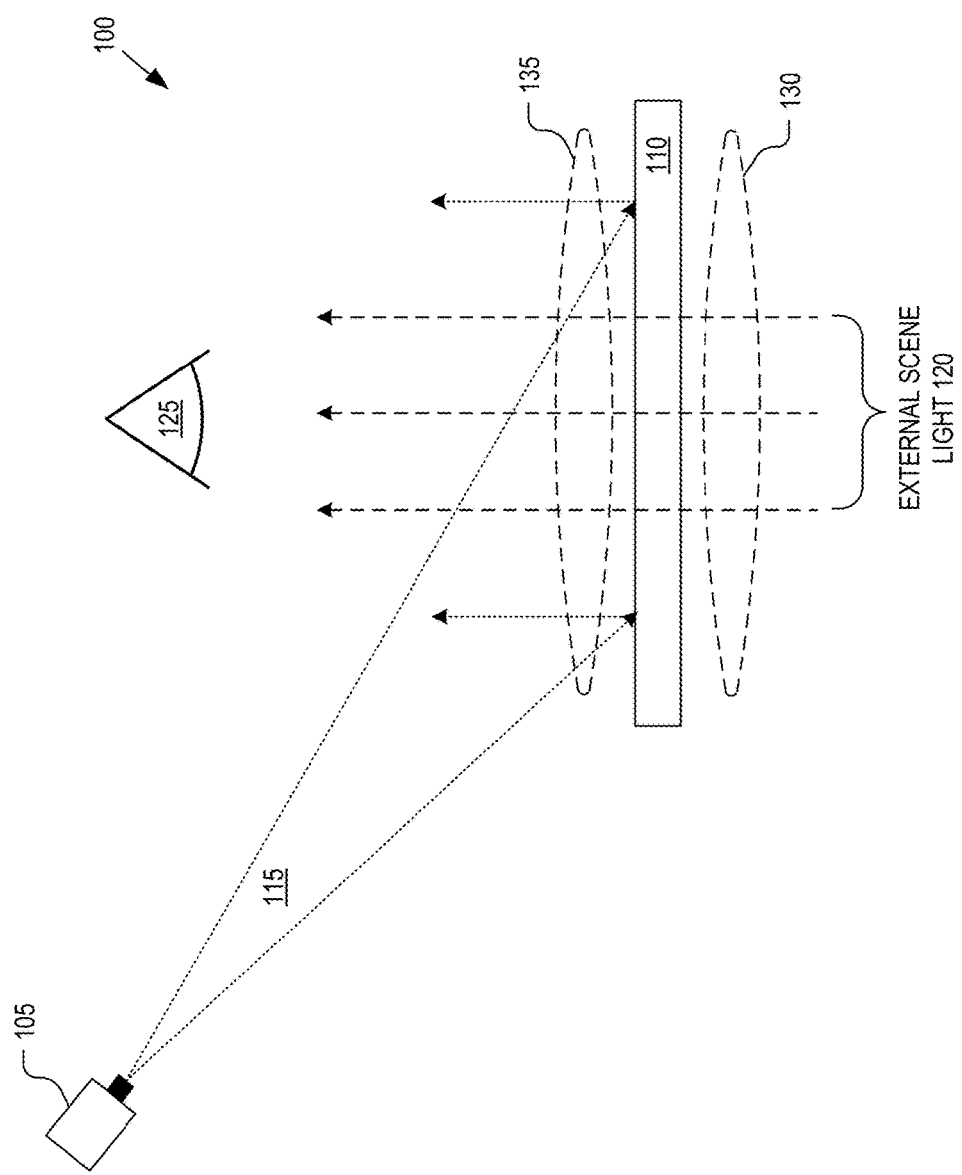
FIG. 1 is a functional block diagram illustrating challenges with incorporating an eye prescription with a see-through near-to-eye display.

FIG. 1 is a functional block diagram illustrating challenges with incorporating an eye prescription into a see-through near-to-eye display 100. Display 100 includes an image source 105 and a see-through optical combiner 110. Optical combiner 110 operates to overlay or otherwise combine the image light 115 output from image source 105 with external scene light 120 that passes through optical combiner 110. The combined image is directed to eye 125 along a combined viewing path extending from the eye-ward side of optical combiner 110 towards eye 125.

Integrating a corrective eye prescription into display 100 for users that do not wear contact lenses presents some challenges to do so in a cost effective manner that does not unduly add weight or otherwise sacrifice industrial design. For example, if a corrective lens 130 is positioned over just the external scene side of optical combiner 110, then image light 115 does not receive any prescriptive correction. Corspondingly, if a corrective lens 135 is positioned over the eye-ward side of optical combiner 110, then image light 115 traverses this lens twice compared to only a single traversal by external scene light 120, resulting in unequal prescriptive correction being applied to the two images.

Figures 2A, 2B:
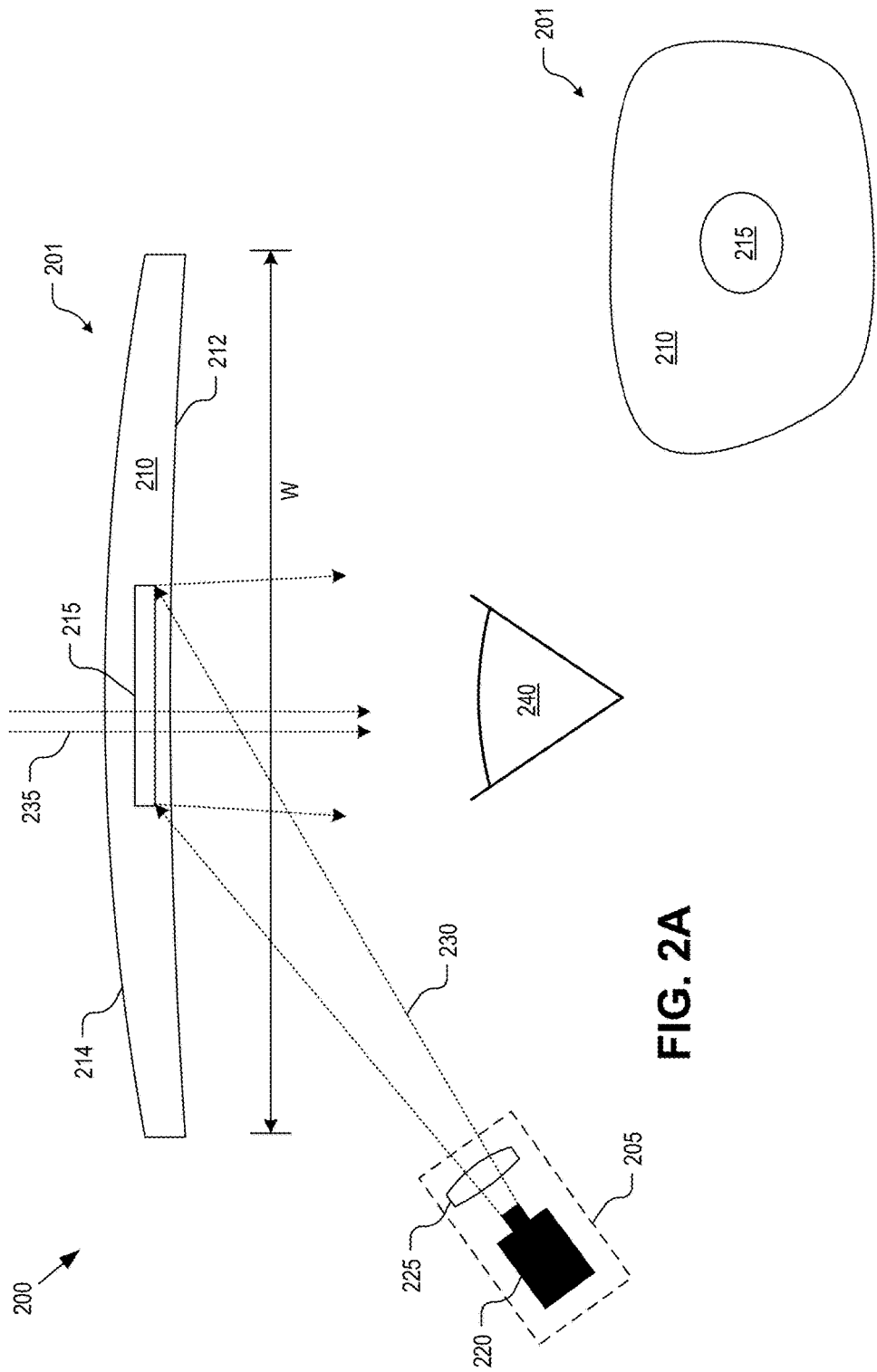
FIGS. 2A & 2B are functional block diagrams illustrating different views of a head wearable display including a prescriptive see-through eyepiece, in accordance with an embodiment of the disclosure.

FIGS. 2A & 2B are functional block diagrams illustrating different views of a head wearable display 200 including a prescriptive see-through eyepiece 201, in accordance with an embodiment of the disclosure. FIG. 2A is a cross-sectional illustration of head wearable display 200 while FIG. 2B is a side view illustration of just eyepiece 201. Head wearable display 200 overcomes the challenges described above in connection with display 100 and is capable of applying prescriptive correction to both the image light and the external scene light while maintaining desirable industrial design. The corrective prescriptions discussed herein may be used to correct nearsightedness, farsightedness, or other visual impairments. Head wearable display 200 may be implemented as in free-space near-to-eye configuration having various form factors, such as an eyeglasses configuration. Head wearable display 200 may also be referred to as a head mounted display ("HMD") or a heads up display ("HUD"). Other applications are possible as well.

The illustrated embodiment of display 200 includes prescriptive see-through eyepiece 201 and an image source 205. The illustrated embodiment of eyepiece 201 includes a meniscus lens body 210, having an eye-ward side 212 and an external scene side 214, and an optical combiner 215. The illustrated embodiment of image source 205 includes a display 220 and a lens 225.

During operation, image source 205 generates image light 230, which is a free-space projection onto eye-ward side 212 of eyepiece 201. In the illustrated embodiment, image light 230 is generated by display 220 and output through lens 225. Display 220 may be implemented using a variety of display technologies including a liquid crystal display ("LCD"), a liquid crystal on silicon ("LCoS") display, a micro light emitting diode ("LED") display, an organic LED ("OLED"), a pico-projector, or otherwise. Lens 225 may be included to provide magnification and/or collimation to image light 230. In some embodiment, lens 225 may also provide some additional prescriptive lensing. For example, a fixed number of lenses 225 (e.g., 5 different ones) may be manufactured and selected for use with user prescriptions that fall within fixed diopter ranges.

Image light 230 is incident into meniscus lens body 210 through eye-ward side 212. Eye-ward side 212 has a concave curvature that provides prescriptive lensing to image light 230 both upon entry into meniscus lens body 210 and exit out of meniscus lens body 210 after reflection from optical combiner 215.

Optical combiner 215 is disposed within meniscus lens body 210 between external scene side 214 and eye-ward side 212. Optical combiner 215 is a partially reflective and partially transmissive optical element that serves to both partially reflect display light 230 and partially transmit external scene light 235 in a manner that combines these two images into a combined image directed along an eye-ward direction towards a user's eye 240. Optical combiner 215 has two modes of operation. In reflection, optical combiner 215 imparts lensing power to image light 230. In transmission, optical combiner 215 imparts substantially no optical power to external scene light 235. Accordingly, optical combiner 215 along with the concave curvature of eye-ward side 212 of meniscus lens body 210 are collectively configured to impart prescriptive lensing to image light 230, while the convex curvature of the external scene side 214 and the concave curvature of eye-ward side 212 are collectively configured to impart the prescriptive lensing to external scene light 235. The optical power of optical combiner 215 in reflection takes into account the double pass of display light 230 across eye-ward side 212 to achieve the user's prescriptive lens. Since external scene side 214 is independent of the optical path of image light 230 and optical combiner 215 does not impart optical power in transmission to external scene light 235, this independence and decoupling between the optical paths of external scene light 235 and image light 230 provides sufficient design flexibility to provide appropriate user prescriptive lensing to the two separate optical paths.

Eyepiece 201 can be fabricated to correct for a range of prescriptions in a traditional meniscus lens form factor. For example, eyepiece 201 may be fabricated to have diopter correction ranging from −8 to +8. In one embodiment, meniscus lens body 210 may have a center thickness as narrow as 1.5 mm or more to accommodate optical combiner 215 while the edges can be less than 3 mm thick for eyepieces of 50 mm or less in width (W).

Eyepiece 201 is formed using a conventional meniscus lens form factor, thereby having a desirable industrial design for eyewear. Meniscus lens body 210 may be fabricated of glass, thermoplastic, resin, or other polymer materials using various fabrication techniques as disclosed below. In some embodiments, optical combiner 215 can be fabricated as a single generic element. In other embodiments, a limited number of different optical combiners 215 are fabricated corresponding to different diopter ranges. Since optical combiner 215 need not be specifically tailored on a per prescription basis, the fabrication techniques described below are amenable to mass fabrication.

Figure 3:
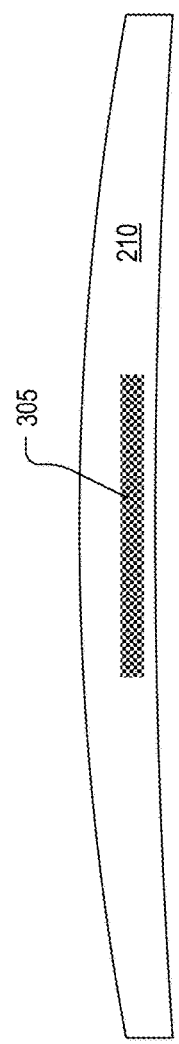
FIG. 3 is a cross-sectional illustration of a prescriptive see-through eyepiece implemented using a reflective holographic or diffractive optical element, in accordance with an embodiment of the disclosure.
Figure 4A:
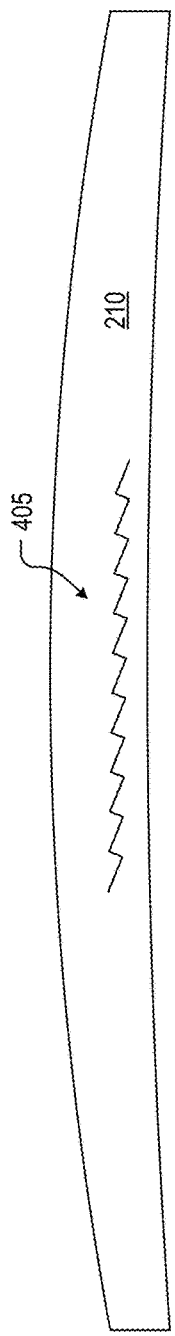
FIGS. 4A & 4B are cross-sectional illustrations of a prescriptive see-through eyepiece implemented using partially reflective serrated surfaces, in accordance with embodiments of the disclosure.
Figure 4B:
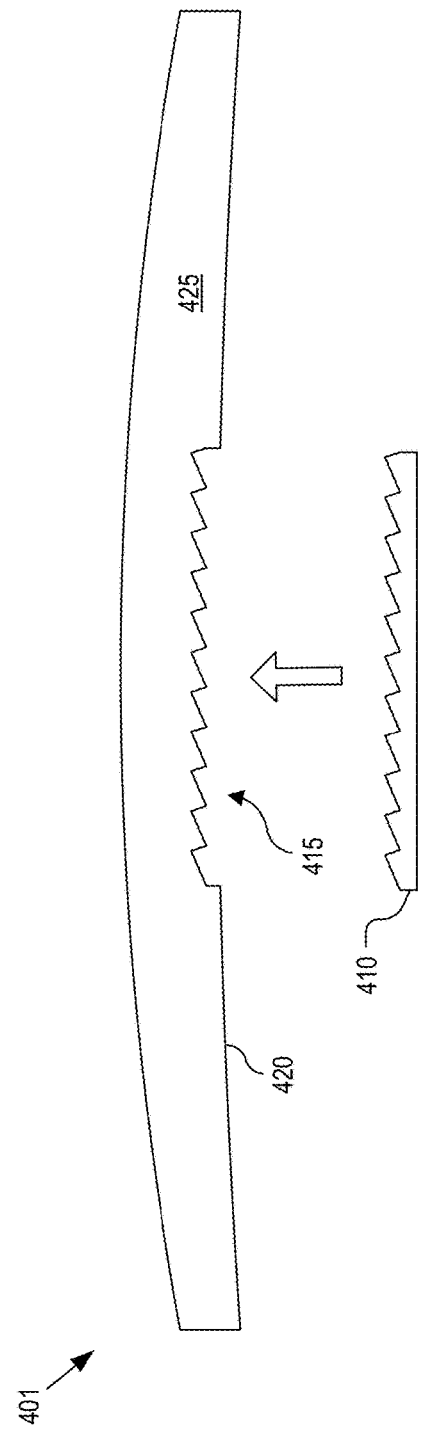
Figure 6:
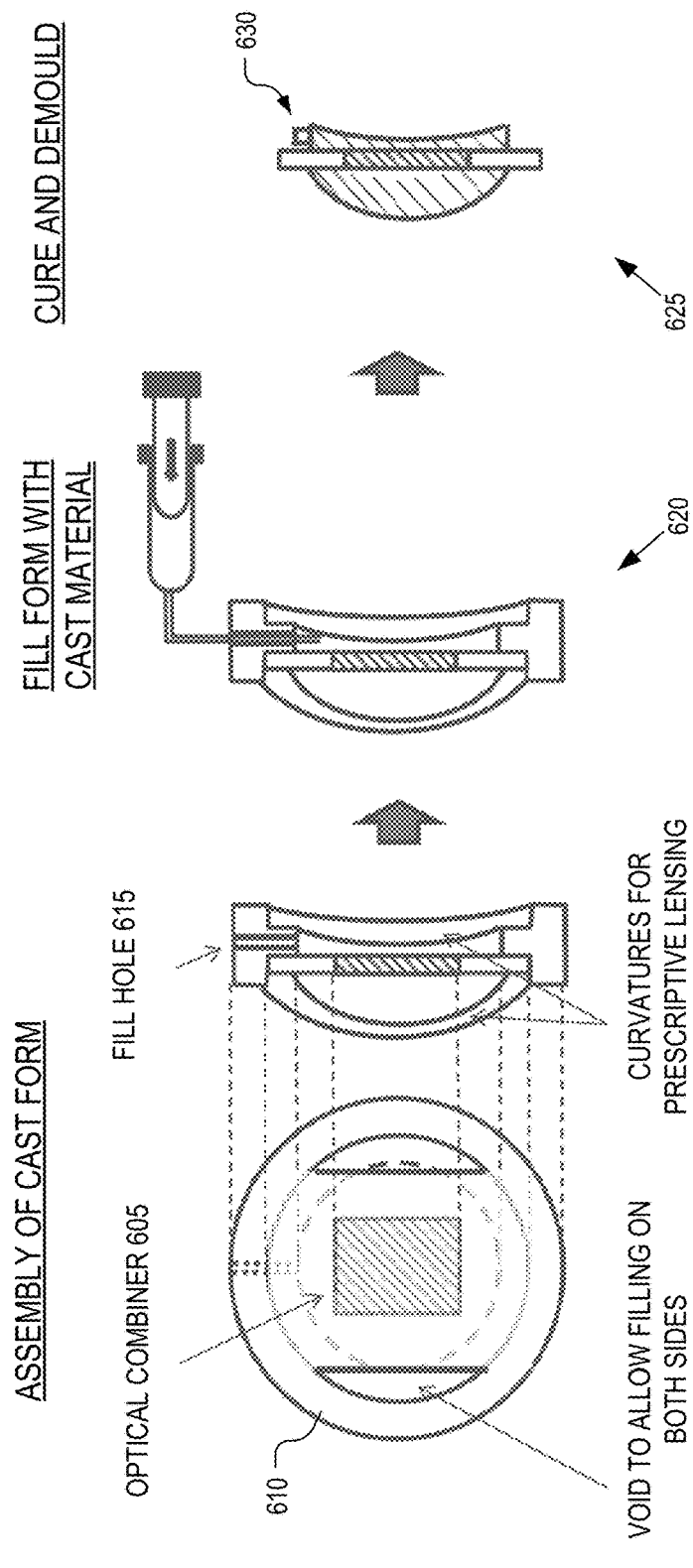
FIG. 6 illustrates a casting technique for fabricating a prescriptive see-through eyepiece, in accordance with an embodiment of the disclosure.

Optical combiner 215 may be fabricated using a variety of different optical combiner technologies. FIGS. 3, 4A, and 4B illustrate demonstrative implementations of eyepiece 201. For example, optical combiner 215 may be implemented as a reflective holographic optical element ("HOE") 305 (as illustrated in FIG. 3) or a reflective diffractive optical element ("DOE"). An example HOE is a volumetric hologram. HOE 305 may be fabricated as a single layer HOE for reflecting monochrome display light or a multi-layer HOE for reflecting multi-color display light. A DOE or HOE may be fabricated into meniscus lens body 210 using a variety of techniques. FIG. 6 (discussed in greater detail below) illustrates an example casting technique.

Figure 7:
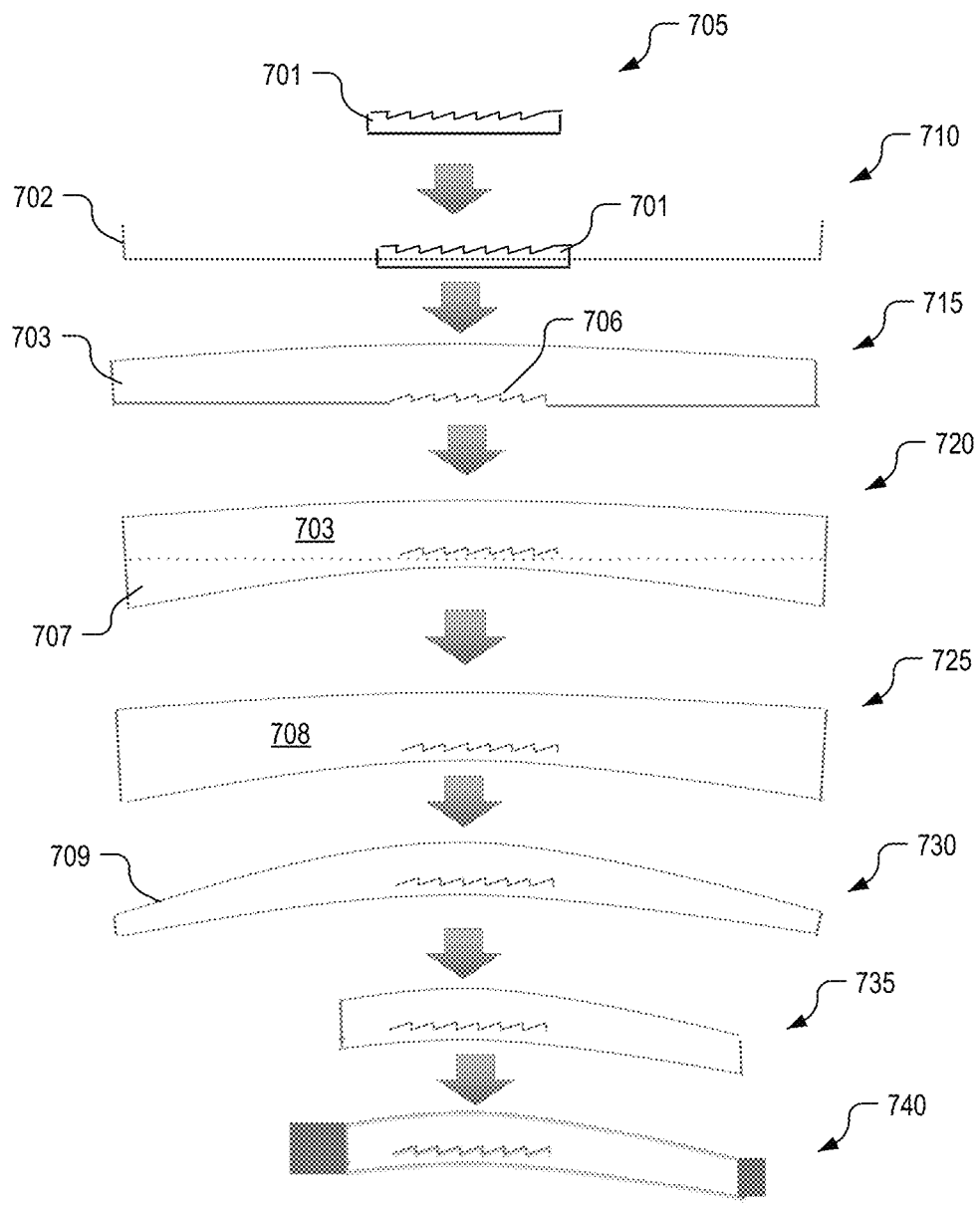
FIG. 7 illustrates an over-casting technique for fabricating a prescriptive see-through eyepiece, in accordance with an embodiment of the disclosure.
Figure 8:
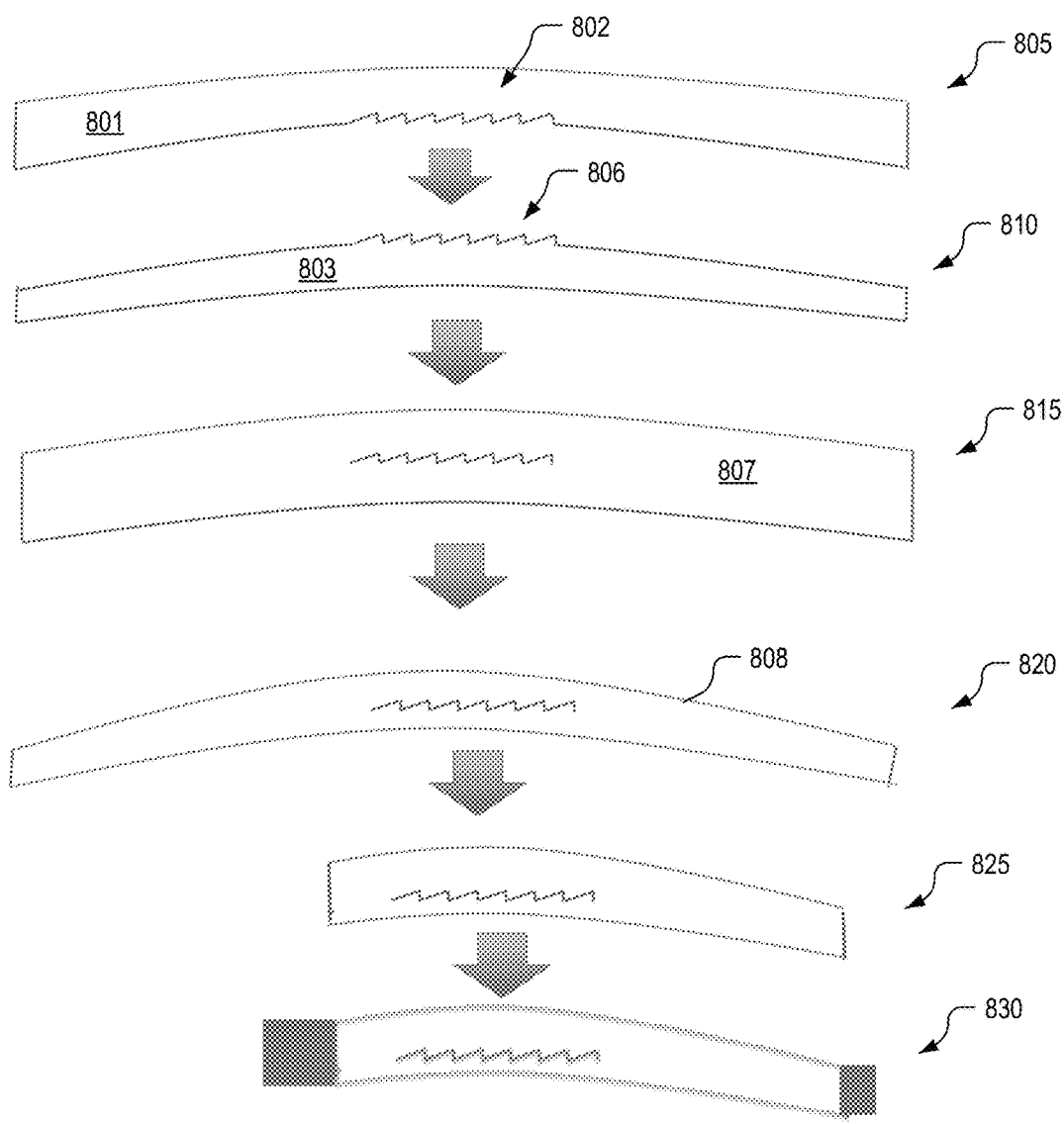
FIG. 8 illustrates an injection molding technique for fabricating a prescriptive see-through eyepiece, in accordance with an embodiment of the disclosure.

Alternatively, optical combiner 215 may be implemented using a plurality of serrated surfaces 405 (as illustrated in FIG. 4A) each conformally coated with a partially reflective coating (e.g., beam splitter coating, multi-layer dichroic coating, etc.). In one embodiment, each serrated surface 405 is a curved surface that imparts optical power in reflection. Since serrated surfaces 405 are surrounded by one or more materials having a uniform refractive index, serrated surfaces 405 do not impart optical power in transmission. In one embodiment, the edges of serrated surfaces 405 are rounded to eliminate straight interface lines internal to the meniscus lens body. Eliminating straight lines reduces their appearance in the overall lens body since sharp corners can result in refraction locations. Serrated surfaces 405 may be fabricated within meniscus lens body 210 using a variety of techniques. FIG. 7 (discussed in greater detail below) illustrates an example over-casting technique. FIG. 8 (discussed in greater detail below) illustrates an example injection molding technique. FIG. 4A illustrates an optical combiner implemented with a plurality of partially reflective serrated surfaces; however, in other embodiments, the optical combiner may include any number N of reflective surfaces including N=1. In an embodiment of N=1, the optical combiner includes a single curved, continuous, partially reflective surface.

FIG. 4B illustrates an eyepiece 401 that is fabricated using an insert 410 to implement the optical combiner. In other words, the optical combiner is fabricated on or into insert 410 that has a size and shape to fit into a recess 415 within the eye-ward side 420 of meniscus lens body 425. In one embodiment, insert 410 is fabricated of a material that is index matched to meniscus lens body 425 so that the interface between insert 410 and meniscus lens body 425 does not cause refractive bending to external scene light passing through. In one embodiment, insert 410 is bonded into recess 415 using a transparent index match adhesive.

FIG. 4B illustrates the interior surface of recess 415 as having complementary topography for mating to the serrated surfaces of insert 410. In other embodiments, the interior surface need not complement the mating surface of insert 410. In these embodiments, index matching glue may be used to fill any voids.

In various embodiments, either the serrated surfaces of insert 410 and/or the serrated surfaces within recess 415 may be coated with a partially reflective coating to form the optical combiner functionality. Although FIG. 4B illustrates insert 410 as being implemented with serrated surfaces, in other embodiments, insert 410 may be implemented with a HOE or DOE integrated in or on insert 410.

Eyepiece 401 is well-suited for implementing a head wearable display having a prescriptive see-through eyepiece that is amenable to high volume manufacturing techniques. In one embodiment, a limited number of generic meniscus lens bodies 425 may be fabricated each with a different base curvature for the eye-ward side 420. For example, less than eight generic meniscus lens bodies 425, each with a different base curvature for eye-ward side 420, may be fabricated to cover a range of diopters extending from −6 diopters to +4 diopters. In one embodiment, five generic meniscus lens bodies 425 having five different base curvatures for eye-ward side 420 may be adequate. While the eye-ward side 420 is selected from a fixed number of generic base curvatures that correspond to prescriptive diopter ranges, external scene side 430 can be machined (e.g., ground) on a per user basis according to their prescription. Furthermore, in some embodiments, a single generic optical combiner insert 410 may be sufficient for all or multiple generic base curvatures. In yet other embodiments, a limited number of inserts 410 may also be fabricated and each keyed to or selected based upon the user's prescription or the specific generic base curvature selected for meniscus lens body 425. Additionally, a limited number of temple optics (e.g., lens 225) may also be manufactured with each corresponding to a different base curvature and different insert 410. Furthermore, as illustrated below in connection with FIGS. 7 and 8, meniscus lens body 425 may be fabricated from two portions that are bonded together, with the world side portion having a single generic shape that is specifically ground for the user's prescription and an eye-side portion that may be fabricated with multiple instances each having a different generic base curvature.

By using a small number of generic base curvatures for the eye-ward side while custom machining the external scene side, the number of sku components for manufacturing is kept manageable while offering a prescriptive see-through eyepiece that is user specific. For example, to accommodate a −6 to +4 diopter range, five different meniscus lens bodies 425 each having a different base curvature for eye-ward side 420, along with five different inserts 410 each having different optical power and five different lenses 225 each corresponding to a different base curvature may be sufficient. The surfacing of the external scene side of the lens to fine tune distance vision to a specific user's prescription is achievable using conventional ophthalmic lab equipment since this surface is not used for display operation.

Figure 5:
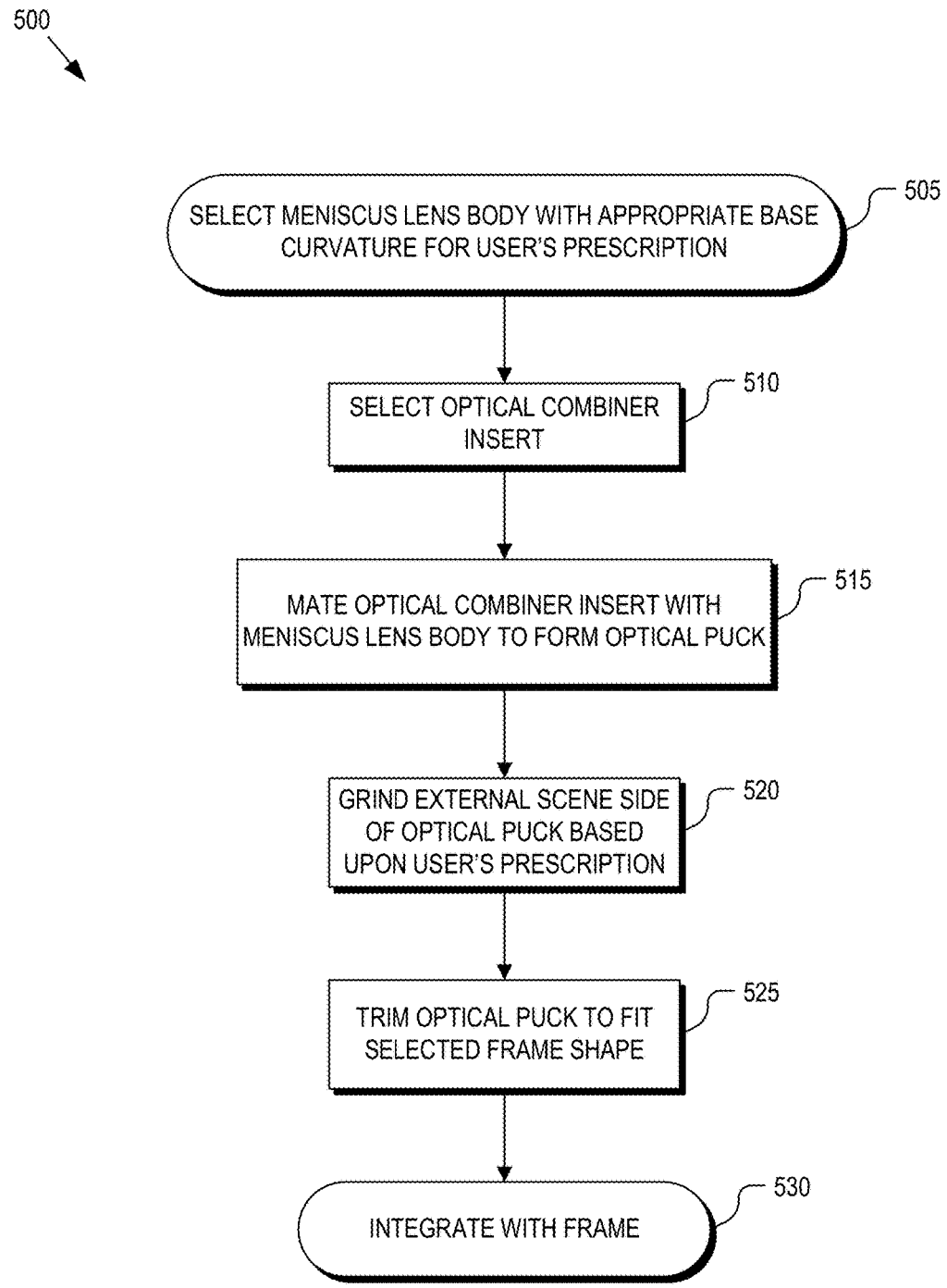
FIG. 5 is a flow chart illustrating a method of fabrication of a prescriptive see-through eyepiece, in accordance with an embodiment of the disclosure.

FIG. 5 is a flow chart illustrating a process 500 for fabricating prescriptive see-through eyepiece 201, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In a process block 505, a meniscus lens body 201 having the appropriate base curvature for eye-ward side 212 is selected according to the user's prescription. As mentioned above, meniscus lens body 201 may be fabricated by bonding a word side portion to an eye-side portion, in which case, selecting the appropriate meniscus lens body 201 includes selecting the appropriate eye-side portion. The selection is made from a limited number of options, such as five base curvature options to cover a diopter range of −6 to +4. Of course, other limited numbers (greater or smaller) of meniscus lens bodies 201 may be fabricated and other diopter ranges may be accommodated.

In a process block 510, the optical combiner 215 for insertion into meniscus lens body 210 is selected. In one embodiment, a single optical combiner 215 may be selected for all user's prescriptions. In other embodiments, a limited number of optical combiners 215 are fabricated with each one corresponding to a specific diopter sub-range or corresponding to the particular base curvature selected in process block 505.

In a process block 515, the selected optical combiner 215 is mated with the selected meniscus lens body 210 to form an optical puck. An optical puck is an unfinished version of eyepiece 201. After the optical puck is formed, external scene side 214 is machined to its final curvature based upon the user's specific prescription. Machining may be achieved via convention ophthalmic grinding (process block 520). In a process block 525, the optical puck is trimmed to fit a selected frame shape and integrated with the user's frame of choice (process block 530).

FIG. 6 illustrates a casting technique for fabricating prescriptive see-through eyepiece 201, in accordance with an embodiment of the disclosure. At 601, the optical combiner is inserted into a mold 610. The mold holds optical combiner 605 at the appropriate location and provides a fill hole 615 to inject the cast material into the mold 610, as illustrated at 620. At 625, the optical puck 630 is removed from the mold 610 and ready for trimming. The casting technique illustrated in FIG. 6 may be used in connection with the process 500 except that process block 505 is replaced with selecting the appropriately mold from a limited number of molds having different base curvatures and process block 515 is replaced with inserting the selected optical combiner into the mold prior to injecting the cast material. The casting technique illustrated in FIG. 6 may be used with any of the optical combiner types described above (e.g., HOE, DOE, serrated surfaces).

FIG. 7 illustrates an over-casting technique for fabricating prescriptive see-through eyepiece 201, in accordance with another embodiment of the disclosure. The over-cast technique of FIG. 7 is well suited for fabricating eyepiece 201 with a serrated surface optical combiner, as illustrated in FIG. 4A. At 705, a metal mode insert 701 is selected from a limited number of such inserts. At 710, metal mold insert 701 is inserted into cast 702. At 715, the cast 702 is filled with the cast material to form a world side portion 703 of eyepiece 201 and the serrated surfaces are coated with a partially reflective material to form the optical combiner 706. At 720, world side portion 703 is over-cast with eye-side portion 707 to form optical puck 708 at 725. At 730, external scene side 709 is machined according to the user's prescription. The optical puck is trimmed at 735 and then integrated with a frame at 740 to form a head wearable display having a prescriptive see-through eyepiece. The over-casting technique illustrated in FIG. 7 may be used in connection with the process 500 with appropriate changes.

FIG. 8 illustrates an injection molding technique for fabricating prescriptive see-through eyepiece 201, in accordance with another embodiment of the disclosure. The injection molding technique of FIG. 8 is also well suited for fabricating eyepiece 201 with a serrated surface optical combiner, as illustrated in FIG. 4A. At 805, a world side portion 801 with negative serrated surfaces 802 is injection molded. At 810, an eye-side portion 803 is injection molded with positive serrated surfaces 806. The positive serrated surfaces 806 are also coated with a partially reflective coating at 810. At 815, world side portion 801 is mated to eye-side portion 803 such that the negative serrated surfaces 802 interlock with and mate to the complementary positive serrated surfaces 806 to form optical puck 807. In one embodiment, the two portions may be bonded together using an index matched adhesive. At 820, external scene side 808 is machined according to the user's prescription. The optical puck is trimmed at 825 and then integrated with a frame at 830 to form a head wearable display having a prescriptive see-through eyepiece. The injection molding technique illustrated in FIG. 8 may be used in connection with the process 500 with appropriate changes.

Figure 9:
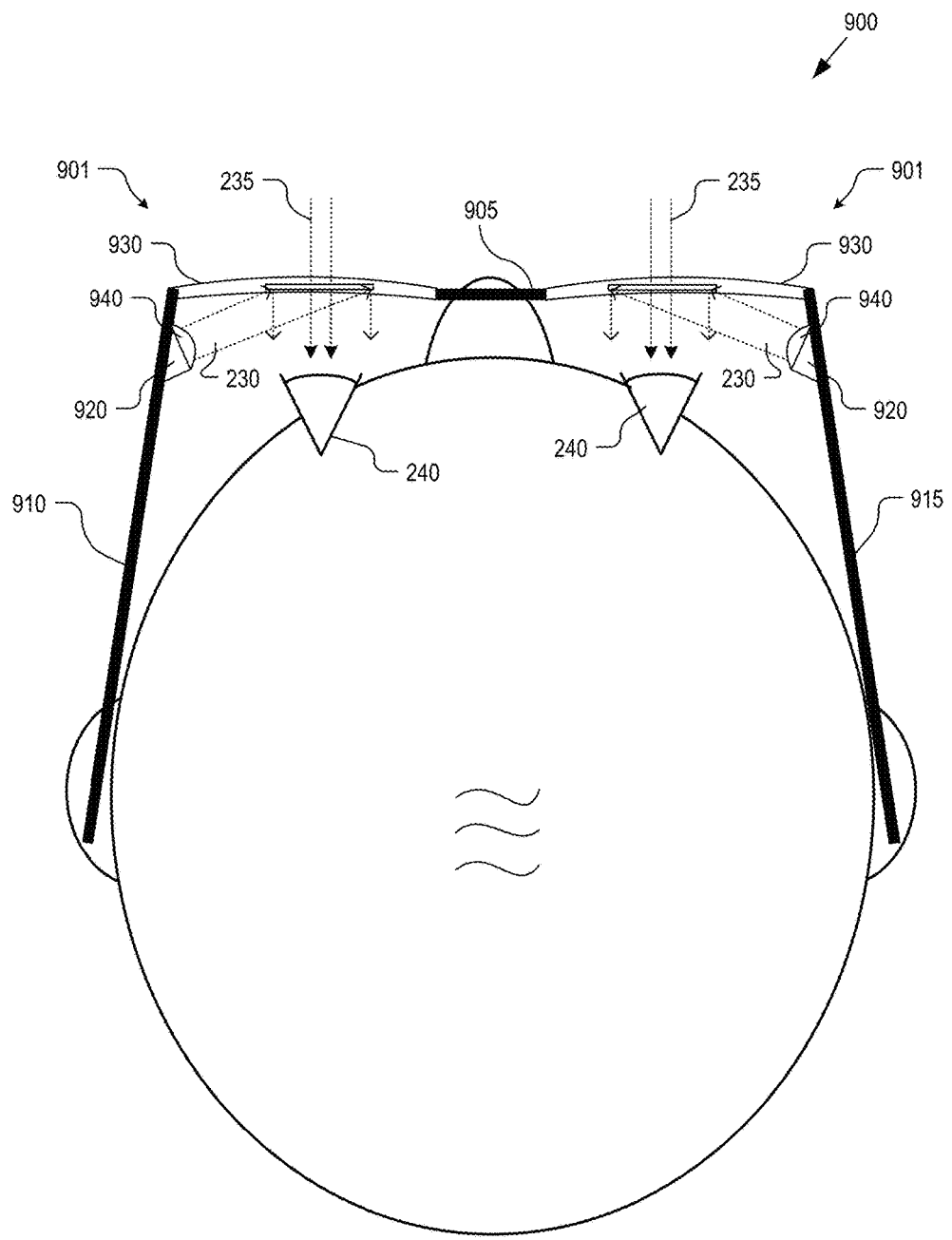
FIG. 9 is a top view of a binocular head wearable display using two prescriptive see-through eyepieces, in accordance with an embodiment of the disclosure.

FIG. 9 is a top view of a binocular head wearable display 900 using a pair of prescriptive see-through eyepieces 901, in accordance with an embodiment of the disclosure. Each eyepiece 901 may be implemented with embodiments of eyepiece 200. The prescriptive see-through eyepieces 901 are mounted to a frame assembly, which includes a nose bridge 905, left ear arm 910, and right ear arm 915. Although FIG. 9 illustrates a binocular embodiment, head wearable display 900 may also be implemented as a monocular display as well.

The prescriptive see-through eyepieces 901 are secured into an eye glass arrangement that can be worn on the head of a user. The left and right ear arms 910 and 915 rest over the user's ears while nose assembly 905 rests over the user's nose. The frame assembly is shaped and sized to position each optical combiner in front of a corresponding eye 240 of the user. Of course, other frame assemblies having other shapes may be used (e.g., a visor with ear arms and a nose bridge support, a single contiguous headset member, a headband, goggles type eyewear, etc.).

The illustrated embodiment of head wearable display 900 is capable of displaying an augmented reality to the user. Each prescriptive see-through eyepieces 901 permits the user to see a real world image via external scene light 235. Left and right (binocular embodiment) image light 230 may be generated by image sources 920 mounted to left and right ear arms 910 and 915. External scene light 235 is prescriptively corrected by the combination of the external scene side and eye-ward side while display light 230 is prescriptively corrected by the combination of the eye-ward side and optical combiner, and in some embodiments by image lenses 940 as well. Corrected image light 230 is seen by the user as a virtual image superimposed over corrected external scene light 235 as an augmented reality. In some embodiments, external scene light 235 may be partially blocked or selectively blocked to provide sun shading characteristics and increase the contrast of image light 230.

The binocular arrangement illustrated in FIG. 9 can accommodate a variety of user inter-pupil distances ("IPDs") using a variety of techniques. In a first embodiment, the face side of the frame can be fabricated in two or three difference widths to accommodate two or three ranges of IPDs, while eyepieces 901 and the temple optics assembly (i.e., image source 920 and image lenses 940) is shifted laterally by a corresponding amount for each frame size. In a second embodiment, a single sized face side of the frame is used and eyepieces 901 and the temple optics assembly are rotated about a point at the center of curvature of the eye-side of each eyepiece 901 to account for different IPDs. In yet a third embodiment, the temple optics assembly is mounted at approximately the same location on the frame, but at different angles relative to eyepieces 901 to account for the different IPD ranges. In this third embodiment, eyepieces 901 may be edged (e.g., cut out to the specific frame geometry from a standard 70 mm circular lens) to position the embedded optical combiner at different locations relative to the frame assembly to accommodate different ranges for IPD.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
    a prescriptive see-through eyepiece including:
        a meniscus lens body having an external scene side with a convex curvature and an eye-ward side with a concave curvature; and
        an optical combiner disposed within the meniscus lens body between the external scene side and the eye-ward side to combine image light incident through the eye-ward side with external scene light incident through the external scene side into a combined image directed along an eye-ward direction out of the meniscus lens body, wherein the optical combiner is partially reflective and imparts substantially no lensing power to the external scene light that passes through the optical combiner, wherein the optical combiner along with the concave curvature of the eye-ward side of the meniscus lens body are collectively configured to impart prescriptive lensing to the image light, and wherein the convex curvature of the external scene side and the concave curvature of the eye-ward side are collectively configured to impart the prescriptive lensing to the external scene light;

wherein the meniscus lens body includes a recess in the eye-ward side and the optical combiner comprises an insert having a size and a shape that inserts into the recess;

wherein the optical combiner is configured to impart lensing power to the image light in reflection; and wherein the optical combiner further comprises:
  a plurality of serrated surfaces, wherein the serrated surfaces are curved to impart the lensing power in reflection; and
  a partially reflective coating disposed over the serrated surfaces; and wherein the recess includes an interior surface having complementary serrated surfaces that are mated to the plurality of serrated surfaces of the insert.

2. The apparatus of claim 1, wherein one or more edges of the plurality of serrated surfaces are rounded to reduce appearance of straight lines internal to the meniscus lens body.

3. The apparatus of claim 1, wherein the insert is bonded into the recess.

4. The apparatus of claim 1, wherein the insert has a first refractive index that is substantially equivalent to a second refractive index of the meniscus lens body.

5. The apparatus of claim 1, wherein the meniscus lens body further comprises:
  a world side portion including the external scene side with the convex curvature and a first interface surface; and
  an eye-side portion including the eye-ward side with the concave curvature and a second interface surface,
  wherein the first and second interface surfaces are bonded together to form the meniscus lens body,
  wherein the optical combiner is disposed at a juncture between the first and second interface surfaces.

6. The apparatus of claim 1, further comprising:
  an image source coupled to emit image light; and
  a frame assembly to support the image source and the prescriptive see-through eyepiece on a head of a user with the optical combiner positioned in front of an eye of the user and the image source positioned peripherally to the eye of the user.

* * * * *